(12) United States Patent
Kawase et al.

(10) Patent No.: US 7,606,654 B2
(45) Date of Patent: Oct. 20, 2009

(54) OXYGEN SENSOR OUTPUT CORRECTION APPARATUS FOR INTERNAL COMBUSTION ENGINE

(75) Inventors: Tomoo Kawase, Aichi-ken (JP); Eiichi Kurokawa, Okazaki (JP); Takahito Masuko, Anjo (JP)

(73) Assignee: Denso Corporation, Kariya (JP)

( * ) Notice: Subject to any disclaimer, the term of this patent is extended or adjusted under 35 U.S.C. 154(b) by 24 days.

(21) Appl. No.: 12/104,027

(22) Filed: Apr. 16, 2008

(65) Prior Publication Data

US 2008/0262704 A1 Oct. 23, 2008

(30) Foreign Application Priority Data

Apr. 18, 2007 (JP) ............... 2007-109613

(51) Int. Cl.
*F02D 41/14* (2006.01)
(52) U.S. Cl. .................. 701/109; 701/114; 123/674
(58) Field of Classification Search .......... 123/674; 701/109, 114
See application file for complete search history.

(56) References Cited

U.S. PATENT DOCUMENTS

| | | | | |
|---|---|---|---|---|
| 5,404,857 | A * | 4/1995 | Schommers | 123/481 |
| 6,874,490 | B2 * | 4/2005 | Surnilla | 123/674 |
| 7,457,700 | B2 * | 11/2008 | Frauenkron et al. | 701/103 |
| 2002/0022921 | A1 * | 2/2002 | Nakagawa et al. | 701/109 |
| 2004/0162667 | A1 * | 8/2004 | Abe et al. | 701/109 |
| 2005/0216175 | A1 * | 9/2005 | Takahashi et al. | 701/109 |
| 2006/0212210 | A1 * | 9/2006 | Daneau et al. | 701/109 |
| 2006/0236990 | A1 * | 10/2006 | Annoura et al. | 123/673 |
| 2007/0023020 | A1 | 2/2007 | Yoshidome | |

FOREIGN PATENT DOCUMENTS

| | | |
|---|---|---|
| JP | 2003-003903 | 1/2003 |
| JP | 2007-032466 | 2/2007 |

* cited by examiner

*Primary Examiner*—Erick Solis
(74) *Attorney, Agent, or Firm*—Nixon & Vanderhye P.C.

(57) ABSTRACT

A correction apparatus for correcting an error in an output of an oxygen sensor such as an A/F sensor installed in an exhaust pipe of an internal combustion engine to measure the concentration of oxygen contained in exhaust gas. The apparatus works to determine a given parameter correlating with an actual concentration of oxygen within the exhaust pipe after start of a fuel cut event and also determine an oxygen concentration-corresponding output based on the given parameter which is a parameter corresponding to an output of the oxygen sensor considered to represent the actual concentration of oxygen correctly. The apparatus samples an output of the oxygen sensor during the fuel cut event and determines a correction factor based on the sampled output of the oxygen sensor and the oxygen concentration-corresponding output for use in correcting an output of the oxygen sensor when the engine is undergoing no fuel cut.

10 Claims, 11 Drawing Sheets

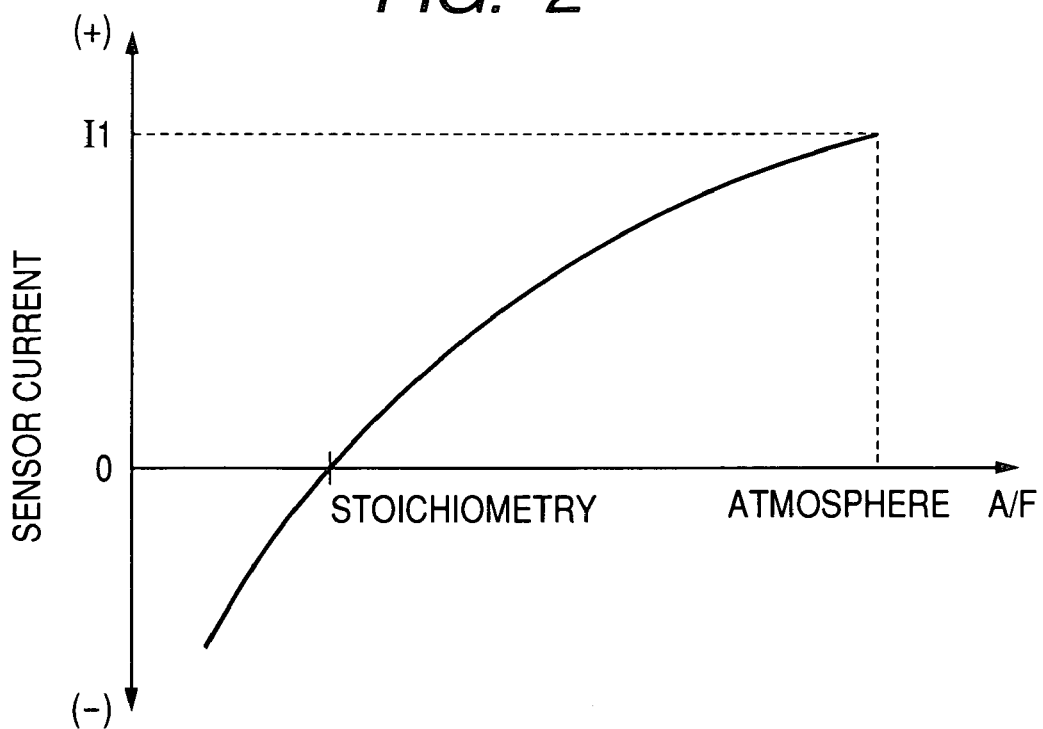
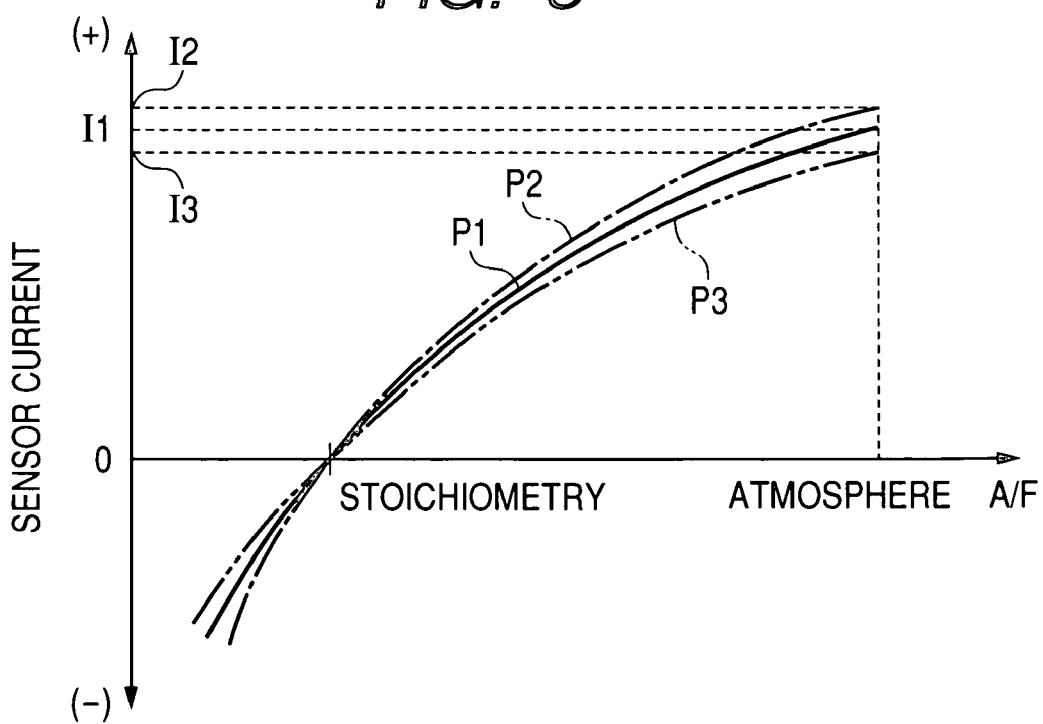

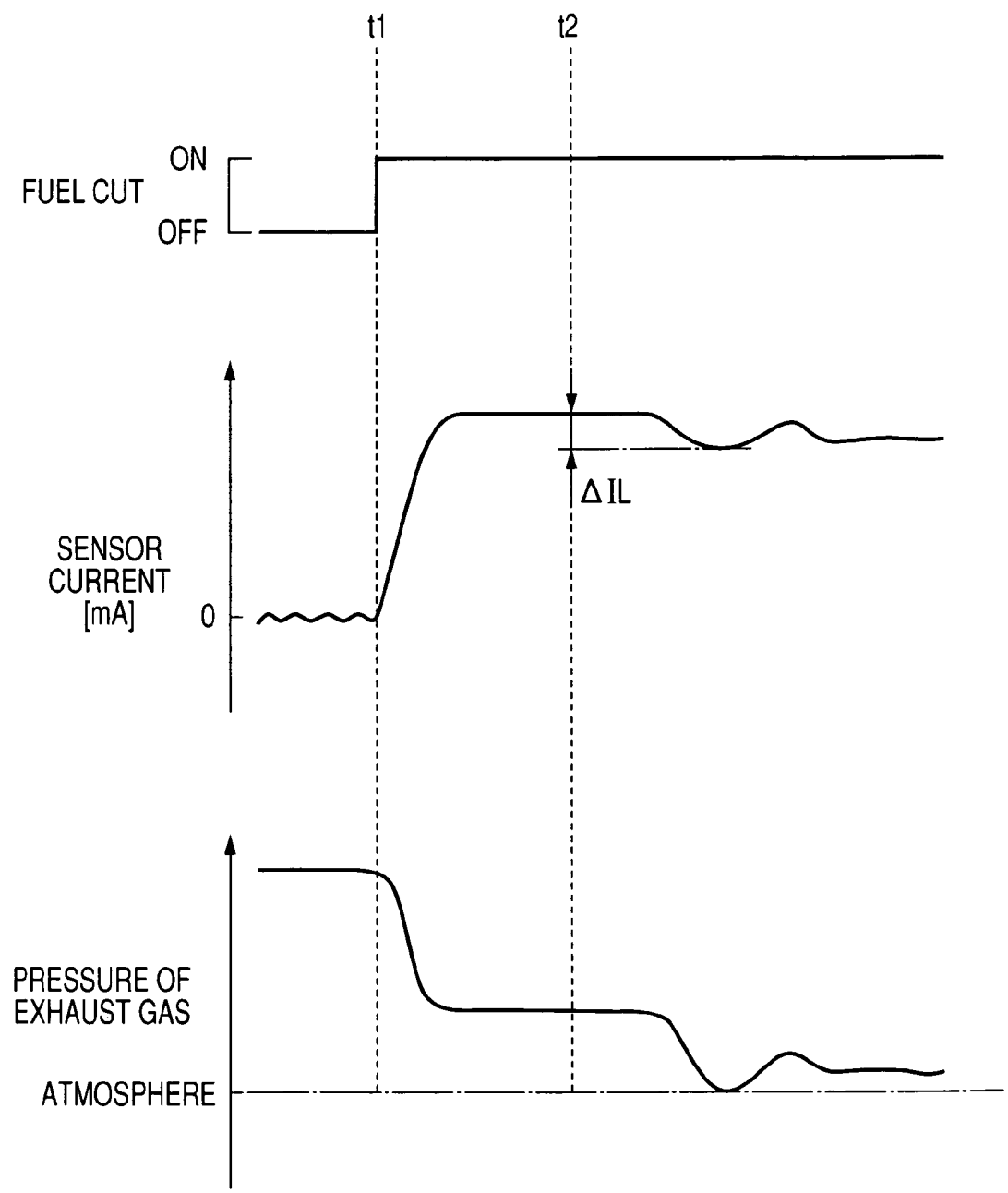

OXYGEN SENSOR OUTPUT CORRECTION APPARATUS FOR INTERNAL COMBUSTION ENGINE

CROSS REFERENCE TO RELATED DOCUMENT

The present application claims the benefit of Japanese Patent Application No. 2007-109613 filed on Apr. 18, 2007, the disclosure of which is totally incorporated herein by reference.

BACKGROUND OF THE INVENTION

1. Technical Field of the Invention

The present invention relates generally to an oxygen sensor output correction apparatus for an internal combustion engine which is designed to cut a supply of fuel into the engine to place an oxygen sensor in the atmosphere or fresh air within an exhaust pipe and sample an output of the oxygen sensor to determine a correction factor for use in correcting or compensating for an error in the output.

2. Background Art

There are various techniques for installing an oxygen sensor in an exhaust pipe of an internal combustion engine and sampling an output therefrom indicating the concentration of oxygen contained in exhaust emissions to perform given control tasks for improving the quantity of the emissions. For example, engine control systems for gasoline engines are known which are designed to sample the output of the oxygen sensor to determine the air-fuel ratio of an air-fuel mixture charged into the engine and bring it into agreement with a target value in an air-fuel ratio feedback control mode for controlling the quality of exhaust emissions. Engine control systems for diesel engines are also known which are designed to control an operation of an EGR (Exhaust Gas Recirculation) valve to enhance the ability of a catalyst to clean the exhaust emissions.

Usually, typical oxygen sensors have the problem with an error in an output therefrom arising from the individual variability in operation or aging thereof. In order to alleviate such a problem, there have been proposed techniques for sampling an output of the oxygen sensor during a fuel cut event in which the engine undergoes a fuel cut for correcting or compensating for an error in the output of the oxygen sensor when the engine is undergoing no fuel cut (which will also be referred to as an under-atmosphere correction mode below) based on the fact the fuel cut during running of the internal combustion engine will cause the inside of the exhaust pipe to be placed in the atmosphere.

Japanese Patent First Publication No. 2007-32466 teaches an internal combustion engine control system designed to execute the under-atmosphere correction mode when a change in output of the oxygen sensor per unit time has dropped below a preselected threshold value during the fuel cut event or when an integrated amount of intake air charged into the engine after the start of the fuel cut event has increased above a preselected threshold value.

The engine control system, as taught in the above publication, is designed based on the fact that the combustion gas is usually placed with fresh air within the exhaust pipe after the start of the fuel cut, thus ensuring the accuracy in compensating for an error in an output from the oxygen sensor using an output therefrom, as sampled after the start of the fuel cut.

The inventors of this application measured an actual change in concentration of oxygen within the exhaust pipe after the start of the fuel cut and found that the time the exhaust gas takes to be replaced with the fresh air completely, that is, the time consumed until the concentration of oxygen in the exhaust pipe is brought into agreement with that (i.e., 20.9%) in the fresh air is long, which may cause the concentration of oxygen in the exhaust pipe not to reach that in the fresh air until completion of the fuel cut, thus resulting in an decrease in accuracy in the under-atmosphere correction mode. The inventors observed that the concentration of oxygen in the exhaust pipe may take ten (10) or more minutes to reach that in the fresh air (i.e., 20.9%) after the start of the fuel cut.

SUMMARY OF THE INVENTION

It is therefore a principal object of the invention to avoid the disadvantages of the prior art.

It is another object of the invention to provide a correction apparatus for an output of an oxygen sensor installed in an exhaust pipe of an internal combustion engine which is designed to improve the above described under-atmosphere correction mode.

According to one aspect of the invention, there is provided a correction apparatus for correcting an error in an output of an oxygen sensor installed in an exhaust pipe of an internal combustion engine to measure a concentration of oxygen contained in exhaust gas. The correction apparatus comprises: (a) an oxygen concentration-correlating parameter determining circuit that determines a given parameter correlating with an actual concentration of oxygen contained in the exhaust gas which is emitted from the internal combustion engine into the exhaust pipe after start of a fuel cut event in which the engine undergoes a fuel cut; (b) an oxygen concentration-corresponding output determining circuit that determines an oxygen concentration-corresponding output based on the given parameter, as determined by the oxygen concentration-correlating parameter determining circuit, the oxygen concentration-corresponding output being a parameter corresponding to an output of the oxygen sensor which is to represent the actual concentration of oxygen; and (c) a correction factor determining circuit that, when required to enter a correction mode, samples an output of the oxygen sensor during the fuel cut event and determines a correction factor based on the sampled output of the oxygen sensor and the oxygen concentration-corresponding output, as determined by the oxygen concentration-corresponding output determining circuit for use in correcting an output of the oxygen sensor when the engine is undergoing no fuel cut.

Usually, after the fuel cut event, the gas in the exhaust pipe is replaced with fresh air gradually. When the concentration of oxygen in the exhaust pipe does not reach that in the fresh air until the completion of the fuel cut event, it will result in an error in the sensor current and a decrease in accuracy in the under-atmosphere correction mode. In order to avoid this problem, the oxygen concentration-correlating parameter determining circuit works to determine the given parameter correlating with the actual concentration of oxygen contained in the exhaust gas. The oxygen concentration-corresponding output determining circuit uses the given parameter to determine the oxygen concentration-corresponding output that is considered to correspond to the output of the oxygen sensor representing the actual concentration of oxygen correctly. When required to enter the correction factor the correction mode, the correction factor determining circuit samples the output of the oxygen sensor during the fuel cut event and determines the correction factor based on, for example, a difference between the sampled output of the oxygen sensor and the oxygen concentration-corresponding output. The correction factor is used to compensate for the error in an output of the oxygen sensor when the engine is not undergoing the fuel cut.

In the preferred mode of the invention, the oxygen concentration-correlating parameter determining circuit measures an integrated amount of intake air charged into the engine after the start of the fuel cut event and defines the integral amount as the given parameter correlating with the actual concentration of oxygen. The amount of intake air may be measured by an airflow meter usually installed in an intake pipe of the engine or determined using other parameters representing an operating condition of the engine such as the pressure in the intake pipe of the engine and the speed of the engine.

The oxygen concentration-correlating parameter determining circuit may alternatively measure the lapsed time since the start of the fuel cut event and define the lapsed time as the given parameter correlating with the actual concentration of oxygen. The lapsed time as the given parameter is preferably used under the condition that the amount of intake air per unit time is kept constant.

The oxygen concentration-corresponding output determining circuit may have a map representing a relation between a value of the oxygen concentration-corresponding output and a value of the given parameter correlating with the actual concentration of oxygen and determine the oxygen concentration-corresponding output by look-up using the map.

The oxygen concentration-corresponding output determining circuit may determine the oxygen concentration-corresponding output based on the given parameter, as determined by the oxygen concentration-correlating parameter determining circuit, and a speed of the engine after the start of the fuel cut event. Specifically, a change in speed of the engine during the fuel cut event usually results in a change in mode in which the concentration of oxygen in the exhaust pipe varies. For instance, as the speed of the engine increases, the concentration of oxygen changes to that in the atmospheric air quickly. Conversely, as the speed of the engine decreases, the concentration of oxygen changes slowly. In other words, the rate of change in concentration of oxygen depends upon the integrated amount of intake air charged into the engine. An error in correcting the output of the oxygen sensor arising from such a change in concentration of oxygen depending upon the integrated amount of intake air may, therefore, be eliminated by determining the oxygen concentration-corresponding output using the speed of the engine after the start of the fuel cut event as an additional parameter.

Further, the mode in which the concentration of oxygen in the exhaust pipe changes is usually different between before and after before the warm-up of the engine. The determination of whether the engine has been warmed up or not is achieved by monitoring the temperature of coolant in the engine. The oxygen concentration-corresponding output determining circuit may, therefore, determine the temperature of coolant of the engine after the start of the fuel cut event and define the temperature of the coolant as the given parameter correlating with the actual concentration of oxygen.

The pressure in the exhaust pipe may vary depending upon an instantaneous operating condition of the engine. The variation in the pressure in the exhaust pipe will result in an error in the output of the oxygen sensor. In order to eliminate such an error, the oxygen concentration-corresponding output determining circuit may derive the pressure of exhaust gas emitted from the engine after the start of the fuel cut event and determine whether the correction mode is to be entered or not based on the pressure of exhaust gas.

For instance, when the pressure of exhaust gas is grater than a given threshold value, the oxygen concentration-corresponding output determining circuit may prohibit the correction mode from being entered.

The pressure in the exhaust pipe may also vary depending upon the amount of intake air charged into the engine. The oxygen concentration-corresponding output determining circuit may determine the amount of intake air after the start of the fuel cut event as representing the pressure of exhaust gas and prohibit the correction mode from being entered when the amount of intake air is greater than a given threshold value.

The correction factor determining circuit may store the correction factor as a learned value in a backup memory.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 2 is a graph which demonstrates a relation between the air-fuel ratio of an air-fuel mixture charged into an internal combustion engine and a sensor current that is an output from an A/F sensor used by the engine control system of FIG. 1 to control the air-fuel ratio;

FIG. 3 is a graph which demonstrates sensor current-to-A/F ratio relations which are changed or different due to the aging or the individual variability of an A/F sensor;

FIG. 4 is a graph which demonstrates time-sequence variations in sensor current that is an output from an A/F sensor and pressure in exhaust gas in an exhaust pipe after start of a fuel cut event in which an internal combustion engine undergoes a fuel cut;

DESCRIPTION OF THE PREFERRED
EMBODIMENTS

Figure 1:
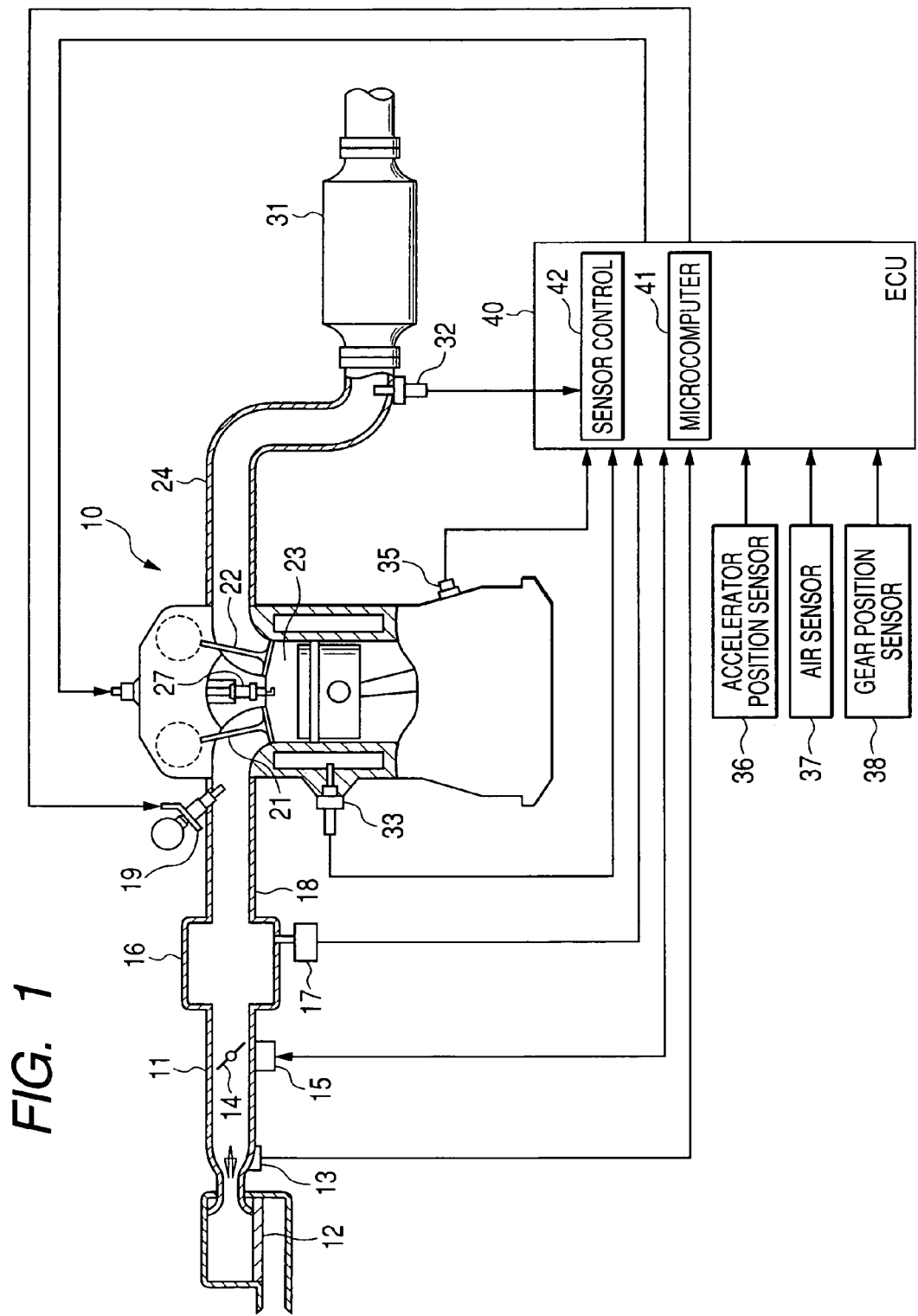
FIG. 1 is a schematic diagram which shows an engine control system according to the first embodiment of the invention.

Referring to the drawings, wherein like reference numbers refer to like parts in several views, particularly to FIG. 1, there is shown an engine control system according to the first embodiment of the invention which is designed to control an operation of an automotive multi-cylinder internal combustion engine 10. The engine control system is implemented by an electronic control unit (ECU) 40 and works to control the quantity of fuel to be injected into the engine 10 and the ignition timing of spark plugs installed in the engine 10.

The engine 10 has an intake pipe 11 and an exhaust pipe 24 connected thereto. An air cleaner 12 is installed in the intake pipe 11. An air flow meter 13 is disposed downstream of the air cleaner 12 to measure the flow rate of intake air charged into the engine 10. A throttle valve 14 is disposed downstream of the air flow meter 13. The throttle valve 14 is closed or opened by a throttle actuator 15 such as a DC motor. The degree of opening or open position of the throttle valve 14 is monitored by a throttle position sensor built in the throttle valve 14. A surge tank 16 is disposed downstream of the throttle valve 14 and has installed therein an intake manifold pressure sensor 17 which measures the pressure in the surge tank 16 (i.e., the pressure in the intake pipe 11). An intake manifold 18 is connected between the surge tank 16 and each of cylinders of the engine 10. Fuel injectors 19 are installed in the intake manifold 18, one for each of the cylinders of the engine 10. The fuel injectors 19 are each made of a solenoid-operated valve and work to spray the fuel near intake ports of the engine 10, respectively.

An intake valve 21 and an exhaust valve 22 are installed in the intake and exhaust ports of each of the cylinders of the engine 10. When the intake valve 21 is opened, a mixture of fuel and air is charged into a corresponding one of combustion chambers 23 of the engine 10. When the exhaust valve 24 is opened, the exhaust gas is discharged to the exhaust pipe 24.

Spark plugs 27 are installed in a cylinder head of the engine 10, one for each of the cylinders of the engine 10. When it is required to ignite the fuel, the ECU 40 applies a high-voltage to a corresponding one of the spark plugs 27 through an ignition device equipped with an ignition coil at a given ignition timing, so that a spark is generated between the center and ground electrodes of the spark plug 27 to ignite the air-fuel mixture within the combustion chamber 23.

A three-way catalyst 31 is installed in the exhaust pipe 24 to convert harmful emissions such as CO, HC, and NOx into harmless or less-harmful products. An A/F sensor 32 is installed upstream of the three-way catalyst 31 which works to measure the concentration of oxygen ($O_2$) contained in the exhaust gas as a function of an air-fuel ratio of the mixture charged into the engine 10. The A/F sensor 32 is equipped with a planer type sensing device which is formed by a lamination of a solid electrolyte layer made of Zirconia ($Z_rO_2$) and a diffusion resistance layer. The sensing device also has a pair of electrodes affixed to opposed surfaces of the solid electrolyte layer and is responsive to application of voltage across the electrodes to produce an electric current as a function of the concentration of oxygen. The sensing device also has affixed thereto a heater which works to heat it up to a desired activation temperature. The A/F sensor 32 may be of a known structure, and explanation thereof in detail will be omitted here.

A coolant temperature sensor 33 and a crank angle sensor 35 are installed in the cylinder block of the engine 10. The coolant temperature sensor 33 works to measure the temperature of engine coolant and output a signal indicative thereof to the ECU 40. The crank angle sensor 35 works to output a rectangular crank angle signal at given angular intervals (e.g., 30° CA) of a crank shaft of the engine 10 to the ECU 40. The engine control system also includes an accelerator position sensor 36, an atmospheric pressure sensor 37, and a gear position sensor 38. The acceleration position sensor 36 works to measure a driver's effort on or position of an accelerator pedal (not shown) and output a signal indicative thereof to the ECU 40. The atmospheric pressure sensor 37 works to measure the atmospheric pressure and output a signal indicative thereof to the ECU 40. The gear position sensor 38 works to measure the position of the gear (i.e., the position of a gear shift lever) of a transmission (not shown) and output a signal indicative thereof to the ECU 40.

The ECU 40 includes a typical microcomputer 41 consisting essentially of a CPU, a ROM, a RAM, an EEPROM, etc. and works to execute engine control programs, as stored in the ROM, to perform a fuel injection control task, etc., based on current operating conditions of the engine 10. Specifically, the microcomputer 41 monitors outputs from the intake manifold pressure sensor 17, the coolant temperature sensor 33, the crank angle sensor 35, the A/F sensor 32, the accelerator position sensor 36, the atmospheric pressure sensor 37, and the gear position sensor 38 and determines the injection quantity that is the quantity of fuel to be injected into each cylinder of the engine 10 and the ignition timing when the fuel is to be injected into each cylinder of the engine 10 to actuate the fuel injectors 19 and the ignition device. The microcomputer 41 calculates the injection quantity so as to bring an actual air-fuel ratio of the mixture, as determined by an output of the A/F sensor 32, into agreement with a target value, as determined based on the current operating conditions of the engine 10, in a feedback control mode.

The ECU 40 also includes a sensor control circuit 42 which measures a sensor current that is an electric current flowing through the electrodes of the sensing device of the A/F sensor 32 as a function of the concentration of oxygen contained in the exhaust gas and amplifies it by a given amplification factor to produce a sensor current signal. The sensor control circuit 42 outputs the sensor current signal to the microcomputer 41. FIG. 2 demonstrates a relation between the air-fuel ratio of the mixture charged into the engine 10 and the sensor current, as produced by the A/F sensor 32. For instance, when the air-fuel ratio shows a stoichiometric value (i.e., 14.7:1), in other words, when the concentration of oxygen in the exhaust gas is zero (0) %, the sensor current will be 0 mA. When the air-fuel ratio shows an atmospheric air-equivalent value that is the value of the air-fuel ratio in the case where the A/F sensor 32 samples the exhaust gas equivalent in concentration of oxygen to the atmospheric air, in other words, when the concentration of oxygen in the exhaust gas is 20.9%, the sensor current will be I1 mA.

The sensor control circuit 42 also works in an applied voltage control mode to change the voltage to be applied to the sensing device of the A/F sensor 32 as a function of an instantaneous value of the sensor current and in a heater control mode to control the exciting current to be applied to the heater built in the A/F sensor 32 to control the activated state of the sensing device of the A/F sensor 32.

Usually, the sensor current flowing through the electrodes of the A/F sensor 32 varies with aging of the A/F sensor 32 or has an individual variability which will lead to a variation in relation between the sensor current and a corresponding value of an air-fuel ratio of the mixture charged into the engine 10. FIG. 3 illustrates sensor current-to-A/F ratio relations which are changed or different due to the aging or the individual variability of the A/F sensor 32. A solid curve (i.e., the same as illustrated in FIG. 2) indicates a reference or basic sensor output characteristic P1 representing a correct relation between the sensor current and the value of the air-fuel ratio of the mixture. An alternate long and short dashed curve and a chain double-dashed curve indicate sensor output characteristics P2 and P3 as deviated from the basic characteristic due to the aging or the individual variability of the A/F sensor 32. For instance, in the case where the air-fuel ratio shows the atmospheric air-equivalent value, in other words, the concentration of oxygen in the exhaust gas is 20.9%, the sensor current in the basic sensor output characteristic P1 is I1 mA, while those in the sensor output characteristics P2 and P3 are I2 and I3. Note that in the illustrated example, when the air-fuel ratio has the stoichiometric value, the sensor currents in the sensor output characteristics P1, P2, and P3 are all 0 mA. The graph of FIG. 3 shows that when the sensor current, as produced by the A/F sensor 32, is subjected to a variation, it will result in an error in determining the concentration of oxygen in the exhaust gas or calculating the value of the air-fuel ratio of the mixture charged into the engine 10.

In order to compensate for such an error, the engine control system of this embodiment works in an under-atmosphere correction mode to suspend the injection of fuel into the engine 10 through the fuel injectors 19 when given operating conditions of the engine 10 are met and eliminate a deviation between the sensor current or output from the A/F sensor 32 (i.e., the concentration of oxygen in the exhaust gas, as measured when the air-fuel ratio corresponds to the atmospheric air during such a fuel cut) and a corresponding value of the air-fuel ratio. Specifically, when the accelerator pedal is released, so that the output of the accelerator position sensor 36 is at a zero (0) level, and the speed of the engine 10 is, for example, 1,000 rpm or more, the microcomputer 41 cuts the fuel injected into the engine 10 to bring the inside of the exhaust pipe 24 into the atmosphere, measures the output from the A/F sensor 32, and determines a correction gain (i.e., a correction factor) based on the measured output of the A/F sensor 32 and an under-atmosphere reference value according to an equation (1) below. The under-atmosphere reference value is an output of the A/F sensor 32 placed in the atmospheric air which represents a 20.9% concentration of oxygen.

Correction gain=Under-atmosphere reference value/
Sensor current actually produced during fuel cut (1)

The correction gain is a sensor output correction factor for use in correcting the deviation of the sensor current, as produced by the A/F sensor 32, from the one in the basic sensor output characteristic P1. For example, in an air-fuel ratio feedback control mode, the microcomputer 41 corrects the sensor current, as outputted from the A/F sensor 32, using the correction gain and calculates an actual air-fuel ratio of the mixture charged into the engine 10 based on the corrected sensor current. This compensates for an error in the output from the A/F sensor 32 arising from the individual variation or aging of the A/F sensor 32 to ensure the accuracy of the air-fuel ratio feedback control.

The correction gain is stored and updated as a learned value in the EEPRON or the backup RAM of the microcomputer 41.

The inventors of this application have found that when the pressure in the exhaust pipe 24 does not become constant during the fuel cut, it will result in a decrease in accuracy of determining the correction gain in the under-atmosphere correction mode. Specifically, immediately after start of the fuel cut, a typical engine control system closes the throttle valve 14 fully, so that the pressure in the exhaust pipe 24 will be near the atmospheric pressure. If the throttle valve 14 is not closed fully immediately after the start of the fuel cut, the pressure in the exhaust pipe 24 is kept above the atmospheric pressure, which will result in an error in the sensor current, as produced by the A/F sensor 32, and a decrease in accuracy in the under-atmosphere correction mode.

FIG. 4 demonstrates a concrete example of the variation in the sensor current after the fuel cut.

After the fuel supplied to the engine 10 is cut-off at time t1, the sensor current, as produced by the A/F sensor 32, increases. When the sensor current is sampled at time t2 before the pressure in the exhaust pipe 24 (i.e., the pressure of exhaust gas) converges at a level equivalent to the atmospheric pressure, it will have an error $\Delta$ IL. We have found that the error $\Delta$ IL depends upon the pressure of exhaust gas, and that the value of the sensor current when the pressure of exhaust gas is at a higher level is greater as a whole than that when the pressure of exhaust gas is at a lower level.

In order to eliminate adverse effects of the above error in the sensor current on determination of the correction gain, the ECU 40 is designed to sample the pressure of exhaust gas after the start of the fuel cut and permit or prohibit the determination of the correction gain. Specifically, based on the fact that the pressure of exhaust gas depends upon the quantity of air charged into the engine 10, the ECU 40 calculates the product of the pressure of air in the intake pipe 11, as measured using the output of the intake manifold pressure sensor 17, and the speed of the engine 10, as measured using the output from the crank angle sensor 35, and determines the quantity of intake air sucked into the engine based on the product (i.e., the quantity of intake air=the pressure in the intake pipe 11×the speed of the engine 10). When the quantity of intake air is greater than a given value, the ECU 40 determines that the pressure of exhaust gas is relatively high, that is, that the error in the sensor current is undesirably great and prohibits the under-atmosphere correction mode.

Additionally, when the speed of the engine 10 is relatively high or the transmission is in a relatively low speed gear position, the quantity of intake air is usually great, so that the pressure of exhaust gas will be high. This, like the above, results in a decrease in accuracy in the under-atmosphere correction mode. The ECU 40 is, therefore, designed to prohibit the under-atmosphere correction mode when the speed of the engine 10 is greater than, for example, 1,500 rpm or the transmission is in a gear position lower than a third speed gear position.

Further, when, after the pressure in the exhaust pipe 24 drops to almost the atmospheric pressure following the start of the fuel cut, the open position of the throttle valve 14 is changed to change the quantity of intake air, it will result in a variation in the pressure of exhaust gas, thus leading to the error in the sensor current. The ECU 40 is, therefore, designed to calculate the rate of change in quantity of intake air based on the quantity of intake air charged into the engine 10 per unit time (or the value of integral of the quantity of intake air) and prohibit the under-atmosphere correction mode when the rate of the change in quantity of intake air is greater than a given value. In other words, when the rate of change in quantity of intake air has dropped below a given value and remains for a preselected period of time, the microcomputer 41 inhibits the output of the A/F sensor 32 from being corrected.

Figure 5:
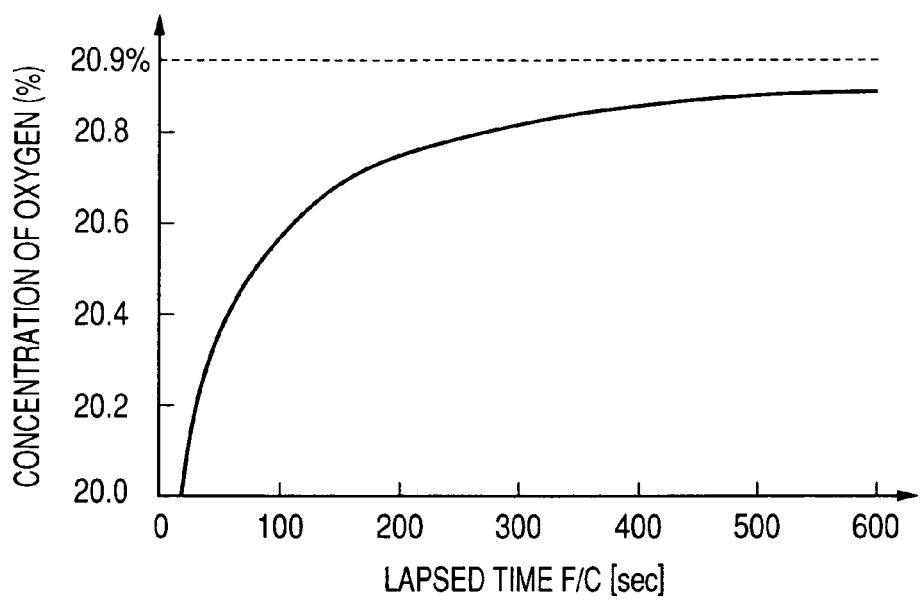
FIG. 5 is a graph which demonstrates a variation in concentration of oxygen in exhaust gas as a function of a lapsed time since the start of a fuel cut event in which an internal combustion engine undergoes a fuel cut.

Usually, after the start of the fuel cut, the gas in the exhaust pipe 24 is replaced with fresh air gradually. The time the gas takes to be replaced with the fresh air completely, that is, the time consumed until the concentration of oxygen in the exhaust pipe 24 is brought into agreement with that (i.e., 20.9%) in the fresh air is usually long, which may cause the concentration of oxygen in the exhaust pipe 24 not to reach that in the fresh air until completion of the fuel cut. Factors causing the gas in the exhaust pipe 24 to take long time to be replaced with the fresh air completely are thought of as fuel adhered to the wall of the intake ports of the engine 10 or the blowby gas. When the concentration of oxygen in the exhaust pipe 24 does not reach that in the fresh air until the completion of the fuel cut, it will result in an error in the sensor current and a decrease in accuracy in the under-atmosphere correction mode. The inventors have found, as illustrated in FIG. 5, that the concentration of oxygen in the exhaust pipe 24 may not reach that in the fresh air (i.e., 20.9%) within ten (10) or more minutes after the start of the fuel cut.

The ECU 40 is, therefore, designed to calculate a total amount or integrated amount of intake air charged into the engine 10 after the start of the fuel cut as a parameter correlating with an actual concentration of oxygen in the exhaust pipe 24 and determine a correction reference value, as will be described later in detail, based thereon as an oxygen concentration-corresponding value for use in correcting the sensor current, as produced by the A/F sensor 32. The ECU 40 calculates the correction gain according to an equation (2) below using an instantaneous value of the sensor current and the correction reference value.

Correction gain=Correction reference value/sensor current during fuel cut (2)

The above described Eq. (1) is to calculate the correction gain using the under-atmosphere reference value that is constant, while Eq. (2) is to calculate the correction gain using the correction reference value that is variable. The ECU 40, as will be described below, uses Eq. (2) to determine the correction value.

Figure 6:
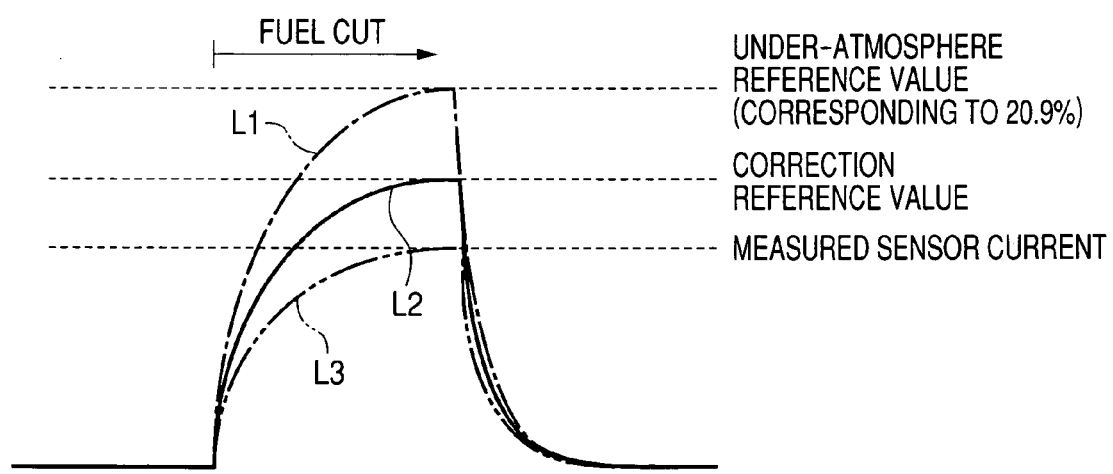
FIG. 6 is a graph which demonstrates variations in sensor current that is an output of an A/F sensor in cases where the concentration of oxygen in an exhaust pipe reaches that in fresh air until completion of a fuel cut event, the concentration of oxygen does not reach that in fresh air, and the A/F sensor has an individual variability in operation or is aged.

FIG. 6 demonstrates variations in the sensor current after the start of the fuel cut. A curve L1 indicates the variation in the sensor current in the case where the pressure in the exhaust pipe 24 drops to the atmospheric pressure completely after the start of the fuel cut. A curve L2 indicates the variation in the sensor current in the case where the concentration of oxygen in the exhaust pipe 24 does not increase up to that in the atmospheric air completely after the start of the fuel cut. The variation in the sensor current, as indicated by the curve L1, is ideal for determining the correction gain. The variation in the sensor current, as indicated by the curve L2, is what is to occur when the A/F sensor 32 is in desired conditions, but the pressure in the exhaust pipe 24 drops to the atmospheric pressure completely. A curve L3 indicates the variation in the sensor current in the case where the A/F sensor 32 has an individual variability or is aged.

When the actual variation in concentration of oxygen in the exhaust pipe 24, as indicated by the curve L2, is different from the ideal one, as indicated by the curve L1, it will result in an error in determining the correction gain based on the under-atmosphere reference value and the sensor current, as measured directly using the output of the A/F sensor 32, in the under-atmosphere correction mode. Such an error may, however, be eliminated by determining the correction gain using the sensor current, as measured directly using the output of the A/F sensor 32, and the correction reference value (i.e., an output of the A/F sensor 32 which is viewed to correspond correctly to the concentration of oxygen in the exhaust pipe 24).

Figure 7:
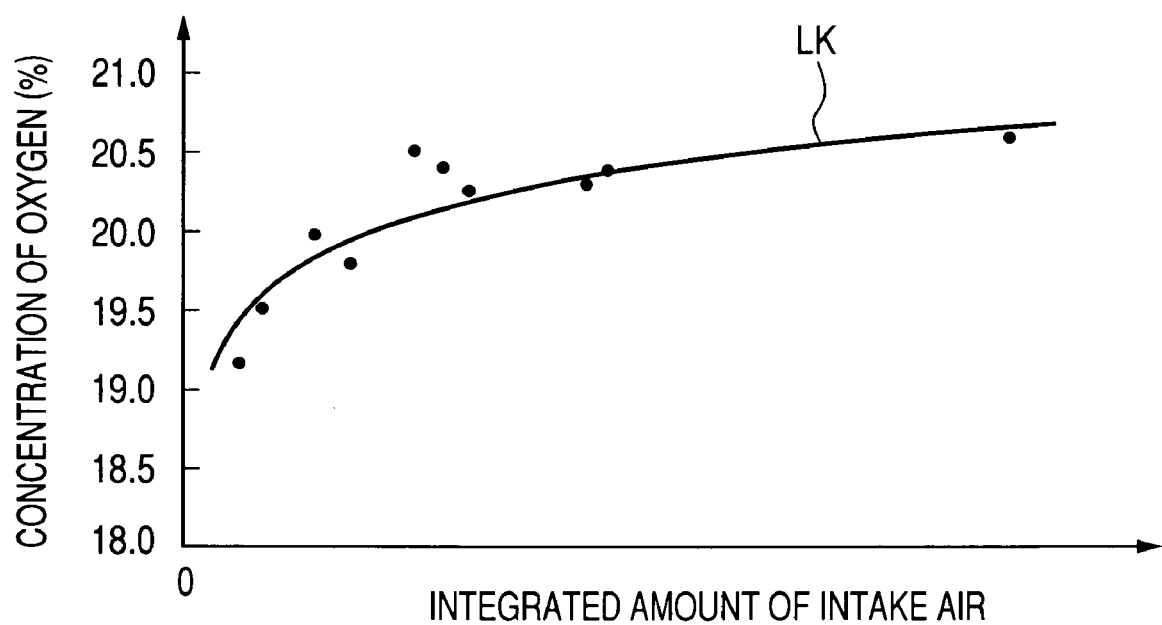
FIG. 7 is a graph which represents a relation between an integrated amount of intake air charged into an internal combustion engine and the concentration of oxygen in an exhaust pipe after the start of a fuel cut.

FIG. 7 is a graph which represents a relation between the integrated amount of intake air charged into the engine 10 and the concentration of oxygen in the exhaust pipe 24 after the start of the fuel cut. The graph is made by plotting correspondences between the integrated amount of intake air and the concentration of oxygen which are measured when the engine 10 is operating in given driving modes. The graph shows that the integrated amount of intake air charged into the engine 10 has a correlation with the concentration of oxygen in the exhaust pipe 24 which may be approximated as a curve LK.

Figure 8:
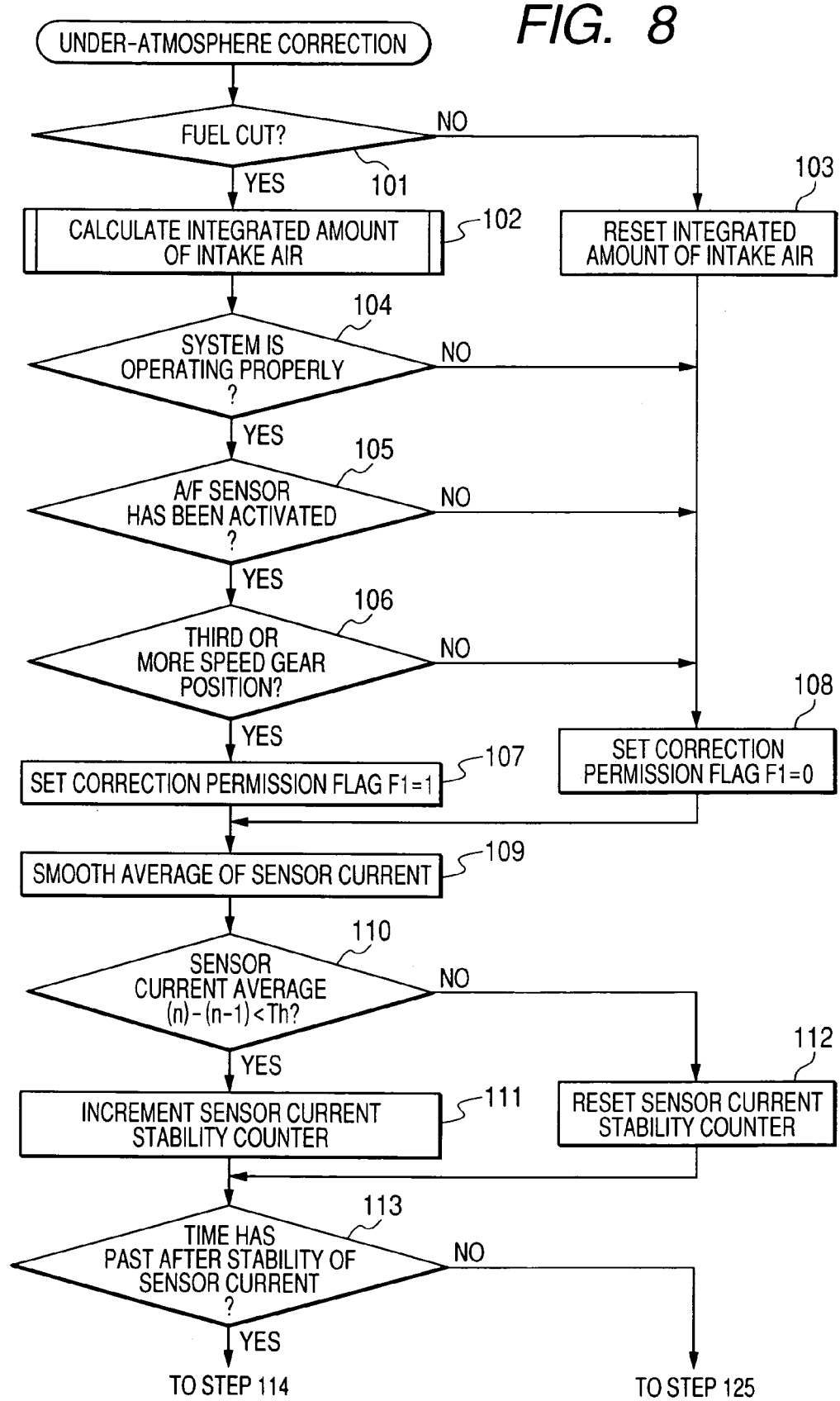
FIGS. 8, 9, 10, and 11 show a flow chart of a program to be executed by the engine control system of FIG. 1 to determine a correction factor or gain for use in correcting an output from an A/F sensor.
Figure 9:
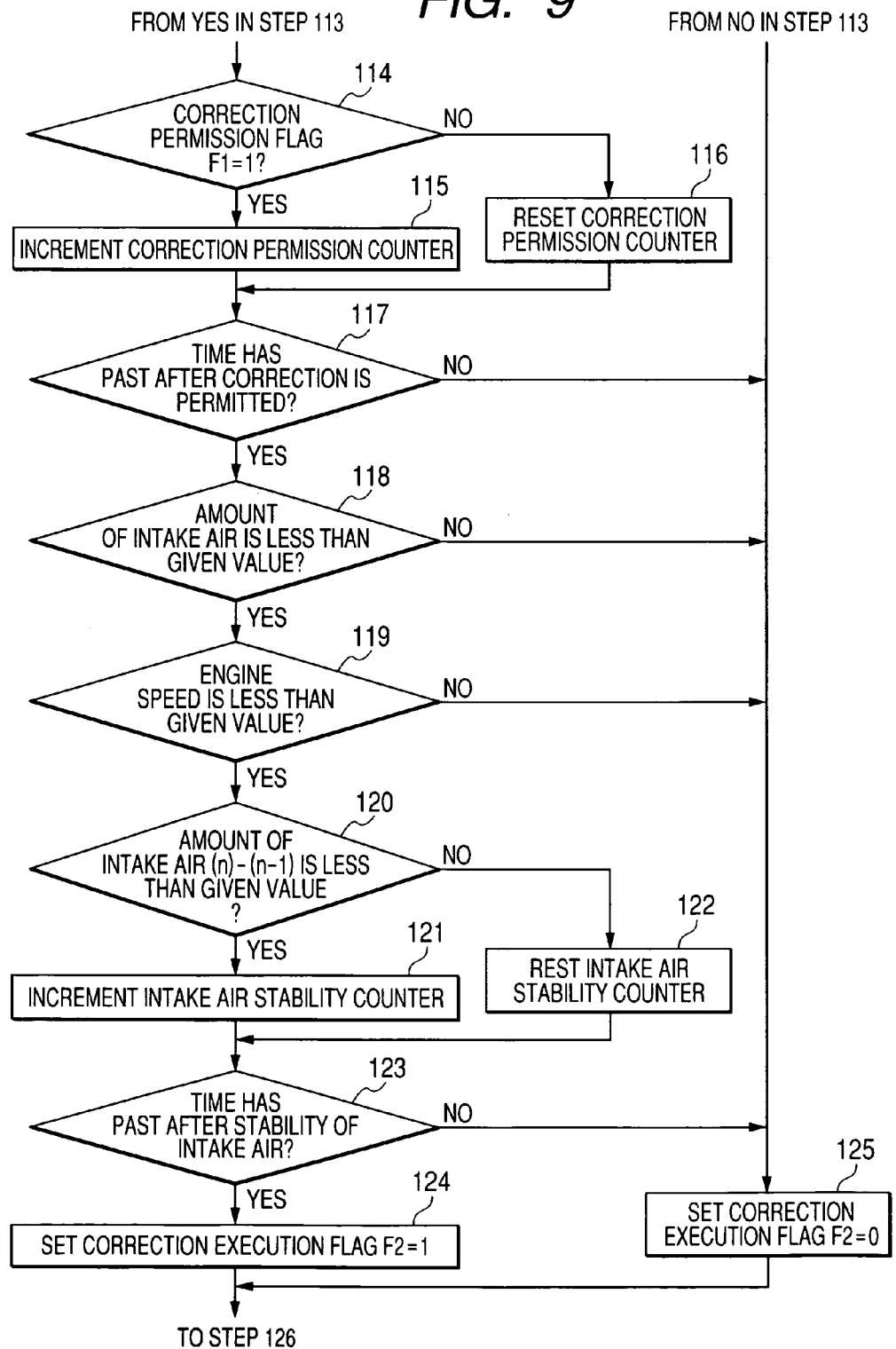
Figure 10:
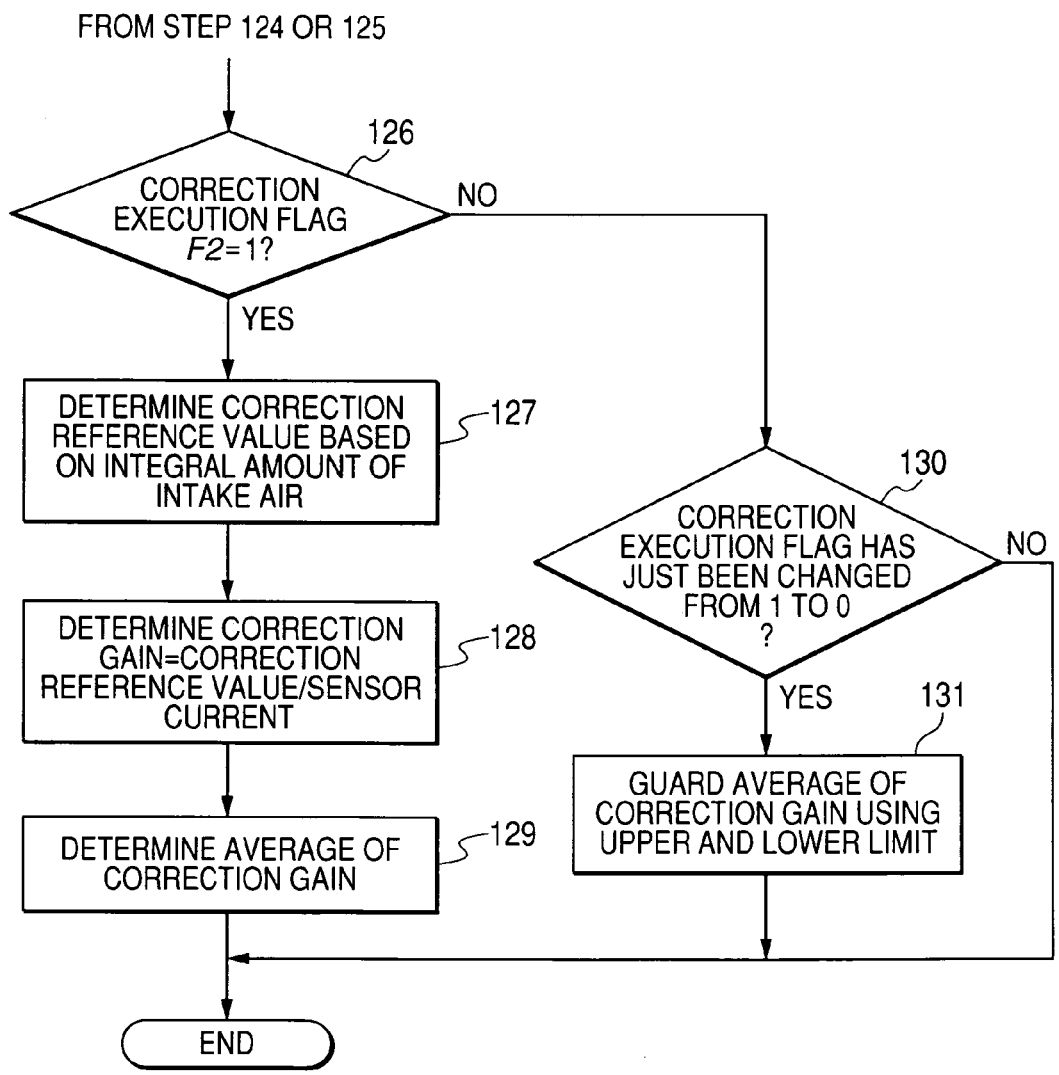
Figure 11:
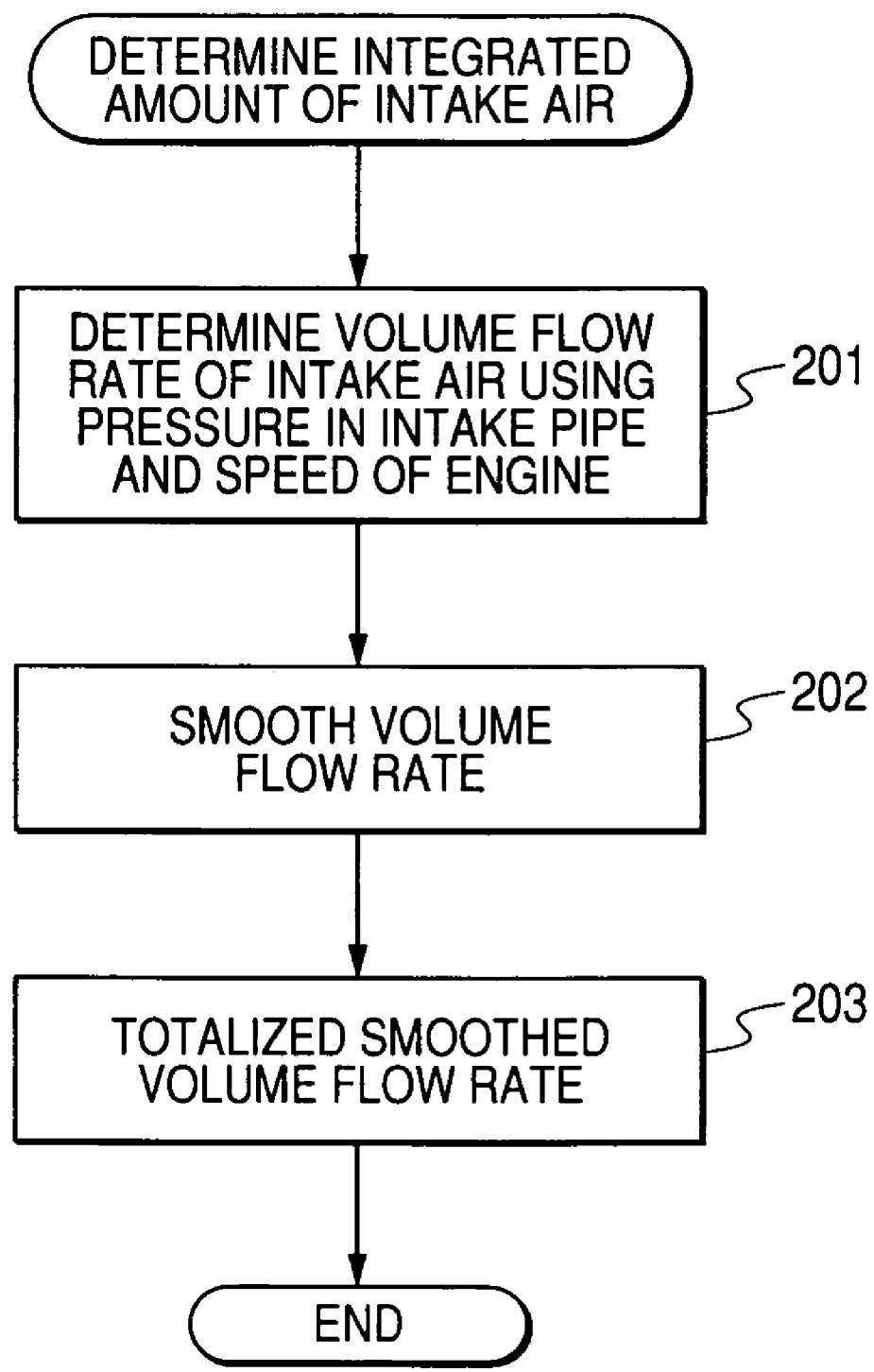

FIGS. 8, 9, and 10 show a sequence of logical steps or program to be executed by the microcomputer 41 of the ECU 40 at an interval of, for example, 10 msec, to correct the sensor current, as produced by the A/F sensor 32, in the under-atmosphere correction mode when the engine 10 is undergoing a fuel cut.

After entering the program, the routine proceeds to step 101 in FIG. 8 wherein it is determined whether a supply of fuel to the engine 10 is now cut off or not. If a YES answer is obtained, then the routine proceeds to step 102 wherein a total or integrated amount of intake air charged into the engine 10 after the start of the fuel cut is determined. Specifically, in step 201 of FIG. 1, the amount of intake air charged into the engine 10 (i.e., a volume flow rate $m^3/sec$.) is computed using the product of the pressure in the intake pipe 11 and the speed of the engine 10. The routine proceeds to step 202 wherein the amount of intake air, as determined in step 201 is smoothed. The routine proceeds to step 203 wherein the smoothed amount of intake air is totalized or integrated. Specifically, in step 203, the amount of intake air, as smoothed in step 202, is converted into a value per unit time and then added to the value of the amount of intake air, as calculated one program cycle earlier.

Referring back to FIG. 8, if a NO answer is obtained in step 101 meaning that the engine 10 is not undergoing the fuel cut, then the routine proceeds to step 103 wherein the value of the integrated amount of intake air, as calculated until one program cycle earlier, is reset to zero (0).

After step 102, the routine proceeds to a sequence of steps 104 to 106 to determine whether conditions permitting the under-atmosphere correction mode to be entered have been met or not. Specifically, in step 104, the microcomputer 41 reads diagnosis data about the operation of the engine control system out of a memory built therein and determines whether the engine control system is operating properly or not. If a YES answer is obtained, then the routine proceeds to step 105 wherein it is determined whether the A/F sensor 32 is in an activated state or not. This determination may be made by monitoring the impedance of the sensing device of the A/F sensor 32 in a known manner. If a YES answer is obtained, then the routine proceeds to step 106 wherein it is determined whether the gear of the transmission is in any position higher in speed than or equal to a third-speed position or not. If a YES answer is obtained, then the routine proceeds to step 107 wherein a correction permission flag F1 is set to one (1), that is, a high level. Alternatively, if a NO answer is obtained in at least one of steps 104, 105, and 106 or after step 103, the routine proceeds to step 108 wherein the correction permission flag F1 is set to zero (0), that is, a low level.

After step 107 or step 108, the routine proceeds to step 109 wherein an average of the sensor current is calculated and then smoothed. Specifically, the sensor current, as produced by the A/F sensor 32, is sampled at a time interval of, for example, several milliseconds for a given crank angle and averaged. For instance, in the case where the engine 10 is a four-cylinder internal combustion engine, and the current program cycle is the first cycle executed immediately after the program is entered, the microcomputer 41 samples the sensor current at a given time interval for 180° CA from start of a combustion stroke of the piston in the first cylinder # 1 and averages the sampled values. When the current program cycle is the second cycle, the microcomputer 41 samples the sensor current as the given time interval for 180° CA from start of the combustion stroke of the piston in the third cylinder #3 and averages the sampled values. Similarly, the average of the sensor current is derived for the combustion strokes in the second and fourth cylinders #2 and #4 in the third and fourth program cycles, respectively. If any one of the averages of the sensor current calculated in this manner for all the cylinders #1 to #4 of the engine 10 lies out of a given permissible range, it is smoothed so as to fall in the permissible range. The microcomputer 41 may alternatively sample the sensor current at a given time interval for 720° CA from the start of the combustion stroke of the piston in the first cylinder #1 and average them every execution of the program, thereby deriving the average of values of the sensor current, as sampled for the combustion strokes in all the cylinders #1 to #4 of the engine 10. The microcomputer 41 then smoothes such an average so as to fall within the permissible range.

Subsequently, the routine proceeds to a sequence of steps 110, 111, and 113 to determine whether the burnt gas has been discharged from the exhaust pipe 24 completely after the start of the fuel cut, so that the exhaust pipe 24 is filled with fresh air, thus resulting in the stability of the sensor current or not using the smoothed value of the average of the sensor current.

Specifically, in step 110, it is determined whether the smoothed value (n) of the average of the sensor current, as calculated in this program cycle, minus the smoothed value (n−1) of the average of the sensor current, as calculated one program cycle earlier, is smaller than a given value Th or not. The fact that such a current change is smaller than the given value Th means that the sensor current is placed in a stable state, that is, the sensor current is kept constant after the start of the fuel cut. If a YES answer is obtained in step 110, then the routine proceeds to step 111 wherein a sensor current stability counter is incremented. Alternatively, if a NO answer is obtained in step 110 meaning that the sensor current does not yet become stable, then the routine proceeds to step 112 wherein the sensor current stability counter is reset to zero (0).

After step 111 or 112, the routine proceeds to step 113 wherein the value of the sensor current stability counter is sampled to determine whether a given period of time has past or not after the sensor current is placed in the stable state, that is, the YES answer is obtained in step 110. If a NO answer is obtained, then the routine proceeds to step 125 of FIG. 9 wherein a correction execution flag F2 is set to zero (0).

Alternatively, if a YES answer is obtained in step 113, then the routine proceeds to step 114 of FIG. 9. A sequence of steps 114 to 117 is to count the time after the under-atmosphere correction mode is permitted to be entered, that is, the correction permission flag F1 is ser to one (1).

Specifically, in step 114, it is determined whether the correction permission flag F1 shows one (1) or not. If a YES answer is obtained, then the routine proceeds to step 115 wherein a correction permission counter is incremented. Alternatively, if a NO answer is obtained, then the routine proceeds to step 116 wherein the correction permission counter is reset to zero (0). After step 115 or 116, the routine proceeds to step 117 wherein the value of the correction permission counter is sampled to determine whether a given period of time has past or not after the correction permission flag F1 is set to one (1). If a NO answer is obtained, then the routine proceeds to step 125 wherein the correction execution flag F2 is set to zero (0).

Alternatively, if a YES answer is obtained in step 117, then the routine proceeds to a sequence of steps 118 and 119 to determine whether the pressure in the exhaust pipe 24 is near the atmospheric pressure or not based on the amount of intake air and the speed of the engine 10. Specifically, in step 118, it is determined whether the amount of intake air charged into the engine 10 is less than or equal to a given reference value or not. If a YES answer is obtained, then the routine proceeds to step 119 wherein the speed of the engine 10 is less than or equal to a given reference value or not. The reference value, as used in step 118, is preselected as the amount of intake air which represents the fact that the pressure in the exhaust pipe 24 is near the atmospheric pressure. The reference value, as used in step 119, is preselected as, for example, 1500 rpm.

If a NO answer is obtained in either of step 118 or 119 meaning that the pressure in the exhaust pipe 24 is higher than the atmospheric pressure, then the routine proceeds to step 125 wherein the correction execution flag F2 is reset to zero (0). Alternatively, if a YES answer is obtained both in steps 118 and 119 meaning that the pressure in the exhaust pipe 24 is placed near the atmospheric pressure, then the routine proceeds to step 120.

A sequence of steps 120 to 123 is to determine whether the amount of intake air is in a stable state or not. Specifically, in step 120, the value of the amount of intake air, as calculated one program cycle earlier, is subtracted from that, as calculated in this program cycle, to determine the rate of change in the amount of intake air charged into the engine 10. Next, it is determined whether the rate of change is less than or equal to a given value or not. If a YES answer is obtained meaning that the rate of change in amount of intake air is small, then the routine proceeds to step 121 wherein an amount-of-intake air stability counter is incremented. Alternatively, if a NO answer is obtained, then the routine proceeds to step 122 wherein the amount-of-intake air stability counter is reset to zero (0).

After step 121 or 122, the routine proceeds to step 123 wherein the value of the amount-of-intake air stability counter is sampled to determine whether the amount of intake air is placed in the stable state, that is, kept constant for a given period of time or not. If a NO answer is obtained, then the routine proceeds to step 125 wherein the correction execution flag F2 is reset to zero (0). Alternatively, if a YES answer is obtained, then the routine proceeds to step 124 wherein the correction execution flag P2 is set to one (1).

As apparent from the above discussion, a sequence of steps 109 to 125 is to determine whether the pressure in the exhaust pipe 24 has dropped to the atmospheric pressure and is kept stable or not. When it is determined that the pressure in the exhaust pipe 24 is kept at the atmospheric pressure, the correction execution flag F2 is set to one (1) to permit the sensor current to be corrected, as will be described below in detail.

Figure 12:
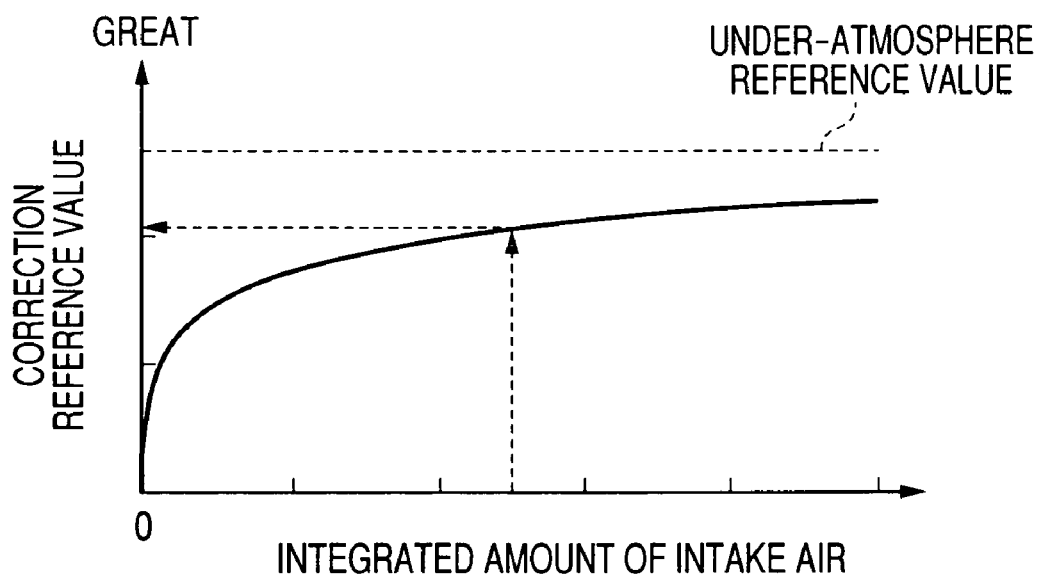
FIG. 12 is a graph which shows a relation between an integrated amount of intake air charged into an internal combustion engine and a correction reference value that is the value of an output from an A/F sensor considered to correspond to an actual concentration of oxygen in an exhaust pipe.

After step 124, the routine proceeds to step 126 of FIG. 10 wherein it is determined whether the correction execution flag P2 is one (1) or not. If a YES answer is obtained meaning that the pressure in the exhaust pipe 24 is kept at the atmospheric pressure, then the routine proceeds to step 127 wherein the correction reference value is calculated based on the integral amount of intake air, as determined in step 102. For instance, the correction reference value is determined by look-up using a map, as illustrated in FIG. 12. The correction reference value in FIG. 12 is so selected as to increase with an increase in integrated amount of intake air and converge at the under-atmosphere reference value.

The correction reference value may alternatively be determined mathematically according to a formula defining a relation between the integrated amount of intake air and the correction reference value.

The routine proceeds to step 128 wherein the correction gain is determined according to Eq. (2), as described above, using the value of the sensor current, as measured now, and the correction reference value, as derived in step 127. The routine proceeds to step 129 wherein an average of the correction gain is calculated and stored as a learned value in the EEPROM. Specifically, when the current program cycle is the first cycle executed immediately after the program is entered, the correction gain is stored in the EEPROM without being averaged. When the current program cycle is the second cycle, the correction gain, as derived one program cycle earlier, and that, as derived in this program cycle, are averaged and stored in the EEPROM.

If a NO answer is obtained in step 126 meaning that the correction execution flag F2=0, then the routine proceeds to step 130 wherein it is determined whether the correction execution flag F2 has been changed from one (1) to zero (0) in this program cycle or not. This determination is made to determine whether the status of the pressure in the exhaust pipe 24 kept at the atmospheric pressure has just changed to be instable or not or whether the fuel cut has just been completed or not. If a YES answer is obtained in step 130, then the routine proceeds to step 131 wherein the average of the correction gain is guarded by an upper and a lower limit. In other words, the average of the correction gain is corrected to fall within a given range of the upper to lower limits.

The correction gain, as derived in the above manner, is used to correct the sensor current, as outputted by the A/F sensor 32, in the air-fuel ratio feedback control mode (i.e., when the engine 10 is undergoing no fuel cut). Specifically, the value of the sensor current, as sampled from the output of the A/F sensor 32 when the ECU 40 is in the air-fuel ratio feedback control mode, is multiplied by the correction gain and used to determine the air-fuel ratio of a mixture charged into the engine 10.

As apparent from the above discussion, the engine control system works in the under-atmosphere correction mode to calculate the integrated amount of intake air charged into the engine 10 after the start of the fuel cut as a parameter correlating with an actual concentration of oxygen in the exhaust pipe 24 to determine the correction reference value that is an output of the A/F sensor 32 which is to correspond correctly to the concentration of oxygen in the exhaust gas and calculate the correction gain based on an instantaneous value of the sensor current and the correction reference value. This eliminates an error in determining the correction gain arising from a difference between an actual concentration of oxygen in the exhaust pipe 24 and that in the atmospheric air after the start of the fuel cut, thereby ensuring the accuracy in correcting the output of the A/F sensor 32 even when the concentration of oxygen in the exhaust pipe 24 does not drop to the atmospheric pressure until completion of the fuel cut, which improves the accuracy in controlling the air-fuel ratio of the mixture to be charged into the engine 10 in the feedback mode.

The map, as illustrated in FIG. 12, is prepared in the ECU 40 which lists the relation between the correction reference value and the integrated amount of intake air correlating to an actual concentration of oxygen in the exhaust pipe 24. The determination of the correction reference value is, therefore, achieved easily only by sampling the amount of intake air cyclically.

When the amount of intake air which is sampled as data about the pressure of exhaust gas after the start of the fuel cut is greater than a given value, the ECU 40 prohibits the correction gain from being calculated, thus eliminating an error in the under-atmosphere correction mode arising from a variation in the pressure in the exhaust pipe 24.

The conditions required to execute the under-atmosphere correction mode or calculate the correction gain are: when the amount of intake air is smaller than a given value; when the speed of the engine 10 is lower than a given value; when the gear of the transmission is placed in a high-speed position; and when the amount of intake air charged into the engine 10 after the start of the fuel cut is in the stable state, that is, the rate of change in amount of intake air is substantially kept constant. Specifically, the sensor current, as produced by the A/F sensor 32, is corrected only when the pressure in the exhaust pipe 24 has dropped near the atmospheric pressure and is kept stable, thus increasing the accuracy in correcting the output of the A/F sensor 32.

The determination of whether the sensor current is in a stable state or not after the start of the fuel cut is made before it is determined whether the amount of intake air is smaller than the given value, thus permitting the under-atmosphere correction mode to be entered when the gas in the exhaust pipe 24 has been replaced with fresh air after the start of the fuel cut.

The correction gain, as determined in the under-atmosphere correction mode, is stored as a learned value in the backup memory such as an EEPROM, thereby ensuring the stability in compensating for an error in the sensor current arising from the individual variability or aging of the A/F sensor 32.

The second embodiment will be described below which is different from the first embodiment as described below.

Figure 13:
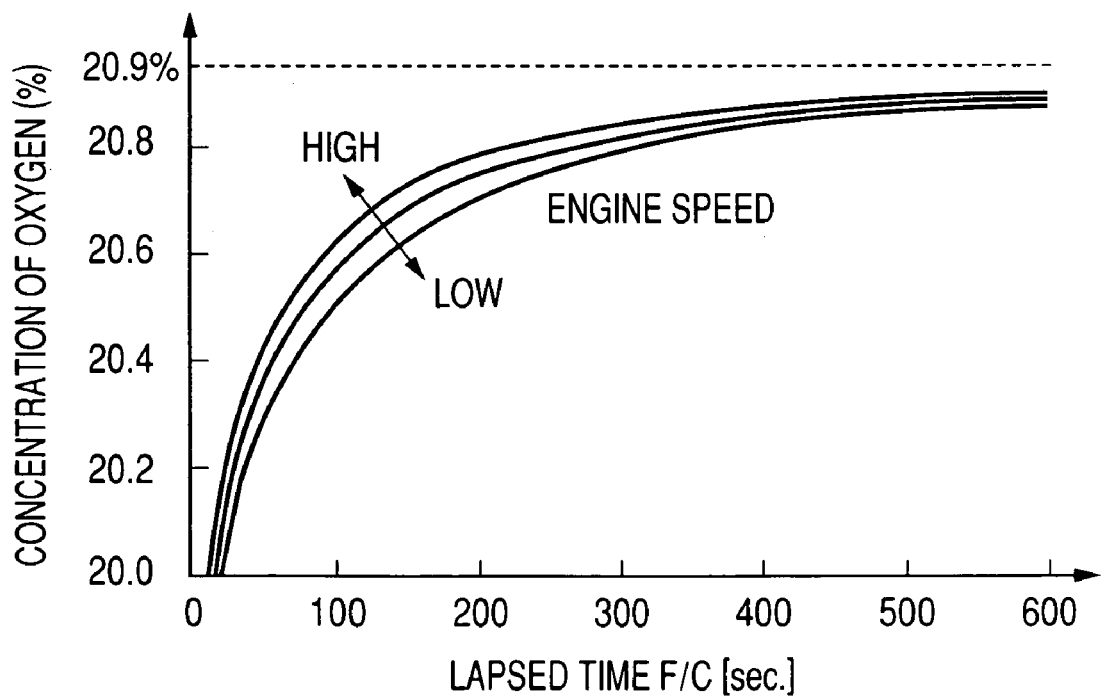
FIG. 13 is a graph which shows a relation between the concentration of oxygen in exhaust gas and a lapsed time since the start of a fuel cut in terms of the speed of the engine.

A change in speed of the engine 10 during the fuel cut will result in a change in mode in which the concentration of oxygen in the exhaust pipe 24 varies. For instance, as the speed of the engine 10 increases, as demonstrated in FIG. 13, the concentration of oxygen changes to that in the atmospheric air quickly. Conversely, as the speed of the engine 10 decreases, the concentration of oxygen changes slowly. In other words, the rate of change in concentration of oxygen depends upon the integrated amount of intake air charged into the engine 10.

Figure 14:
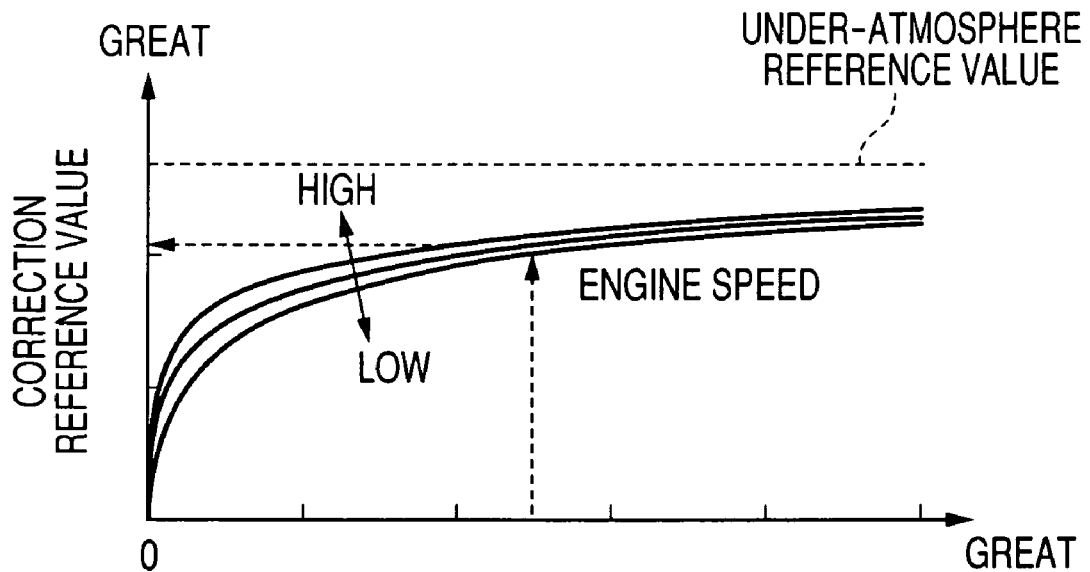
FIG. 14 is a graph which shows relations between an integrated amount of intake air charged into an internal combustion engine after the start of a fuel cut and a correction reference value that is the value of an output from an A/F sensor considered to correspond to an actual concentration of oxygen in an exhaust pipe in terms of the speed of the engine.

In order to eliminate an error in correcting the sensor current produced by the A/F sensor 32 which is caused by the above change in concentration of oxygen depending upon the integrated amount of intake air, the ECU 40 of this embodiment is designed to determine the correction reference value in step 127 of FIG. 10 based on the integrated amount of intake air and the speed of the engine 10 using for example, a map illustrated in FIG. 14. Specifically, the correction reference value is determined so that it becomes great and reaches the under-atmosphere reference value as either of the integrated amount of intake air or the speed of the engine 10 increases. The correction reference value may alternatively be determined by look-up using a plurality of maps each of which represents a relation between the integrated amount of intake air and the correction reference value for one of predetermined speeds of the engine 10.

The engine control system may also be modified as described below.

Figure 15:
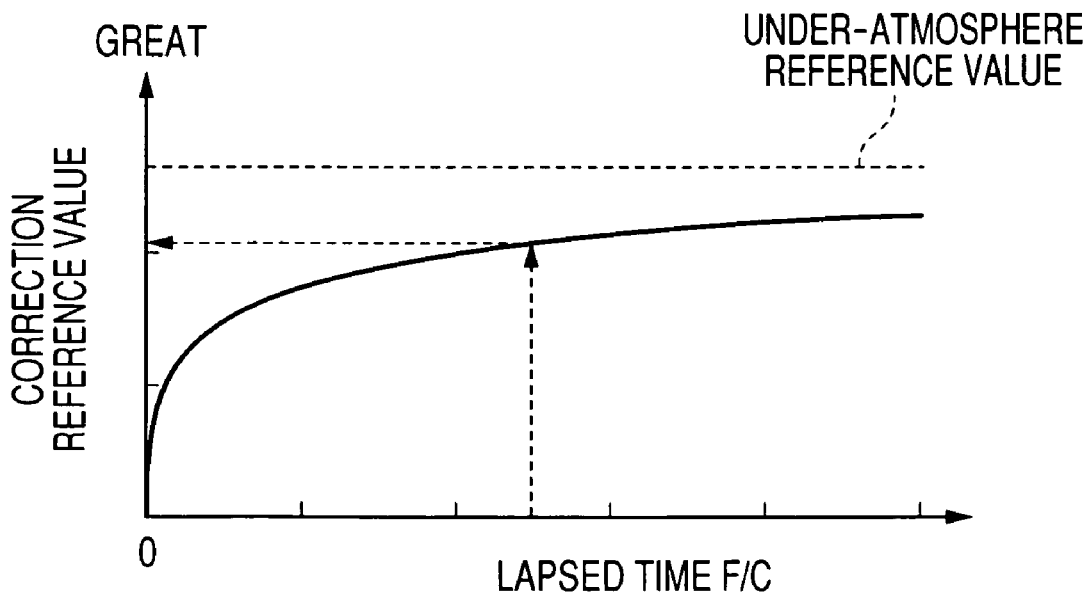
FIG. 15 is a graph which shows a relation between a lapsed time since the start of a fuel cut and a correction reference value that is the value of an output from an A/F sensor considered to correspond to an actual concentration of oxygen in an exhaust pipe in terms of the speed of the engine.

Usually, the concentration of oxygen in the exhaust pipe 24 after the start of the fuel cut has a correlation with the lapsed time since the start of the fuel cut. The concentration of oxygen may, therefore, be determined as a function of such a lapsed time. For example, the concentration of oxygen in the exhaust pipe 24 changes, as demonstrated in FIG. 5, with the lapsed time F/C since the engine 10 has undergone a fuel cut. The ECU 40 may, thus, be designed to have stored therein a relation, as illustrated in FIG. 15, between the correction reference value and the lapsed time F/C and monitor the time since the start of the fuel cut upon entry of the under-atmosphere correction mode to calculate the correction reference value for determining the correction gain for use in correcting the sensor current, as produced by the A/F sensor 32. This correction is made preferably under the condition that the amount of intake air charged into the engine 10 per unit time is constant.

Further, the mode in which the concentration of oxygen in the exhaust pipe 24 changes is usually different between before and after before the warm-up of the engine 10. The determination of whether the engine 10 has been warmed up or not is achieved by monitoring the temperature of coolant in the engine 10. The ECU 40 may be designed to calculate the correction reference value based on the temperature of coolant in the engine 10 after the start of the fuel cut. For example, when the temperature of coolant in the engine 10 is low, that is, the engine 10 has started in a cold condition, the concentration of oxygen in the exhaust pipe 24 usually changes slowly, so that it takes a long time to be coincident with the concentration of oxygen in fresh air. The ECU 40 is, therefore, preferably designed to calculate the correction reference value based on the above difference in change in concentration of oxygen between before and after the warm-up of the engine 10.

The ECU 40, as described above, works to execute the under-atmosphere correction mode or calculate the correction gain when the four conditions are met which are: (1) when the amount of intake air is smaller than a given value; (2) when the speed of the engine 10 is lower than a given value; (3) when the gear of the transmission is placed in a high-speed position; and (4) when the amount of intake air charged into the engine 10 after the start of the fuel cut is in the stable state, that is, the rate of change in amount of intake air is substantially zero (0). The ECU 40 may alternatively be designed to omit all of the second to fourth conditions (2) to (4) or at least one of them.

The ECU 40 may also be designed to permit the under-atmosphere correction mode to be entered to calculate the correction gain when the throttle valve 14 is closed fully after the start of the fuel cut. This is because when the throttle valve 14 is closed fully, it will cause the entry of air into the combustion chambers of the engine 10 to be restricted, thus resulting in a decreased variation in pressure emitted from the engine 10 into the exhaust pipe 24 and ensuring the accuracy in the under-atmosphere correction mode.

The amount of intake air charged into the engine 10 is, as described above, derived by the product of the speed of the engine 10 and the pressure in the exhaust pipe 24, but however, may be measure directly using the airflow meter 13 installed in the intake pipe 11. The pressure in the exhaust pipe 24 may be calculated indirectly or measured directly by installing a pressure sensor in the exhaust pipe 24 and sampling an output therefrom. The pressure of the exhaust gas emitted from the engine 10 usually depends upon the atmospheric pressure and thus is measured preferably also in view of an output from the atmospheric pressure sensor 37.

The ECU 40 may also be designed to execute the under-atmosphere correction mode or calculate the correction gain when two conditions are met instead of the above four conditions (1) to (4) which are: when a given period of time has past since the start of the fuel cut; and when the sensor current is placed in a stable state after the start of the fuel cut. Specifically, the ECU 40 may execute the under-atmosphere correction mode to calculate the correction reference value based on the concentration of oxygen in the exhaust pipe 24 or a parameter correlating therewith (e.g., the integrated amount of intake air) after the start of the fuel cut regardless of the pressure of exhaust gas in the exhaust pipe 24 and determine the correction gain based on the correction reference value and the value of the sensor current.

The engine control system may be used with direct-injection gasoline engines or self-ignition diesel engines. The diesel engines may not be equipped with a throttle valve, but typically have an EGR device which returns a portion of exhaust gas to the intake pipe. The EGR device is usually equipped with an EGR valve, When the EGR valve is opened, it will result in a variation in pressure of exhaust gas within the exhaust pipe 24. The ECU 40, therefore, preferably works to execute the under-atmosphere correction mode using data about the pressure of exhaust gas within the exhaust pipe 24.

The diesel engine usually has an exhaust gas purifier such as a DPF (diesel particulate filter) installed in the exhaust pipe. The exhaust pipe has disposed therein a pressure sensor for recovering the DPF. The ECU 40 may sample an output from the pressure sensor to determine the pressure of exhaust gas.

While the present invention has been disclosed in terms of the preferred embodiments in order to facilitate better understanding thereof it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A correction apparatus for correcting an error in an output of an oxygen sensor installed in an exhaust pipe of an internal combustion engine to measure a concentration of oxygen contained in exhaust gas comprising:

an oxygen concentration-correlating parameter determining circuit that determines a given parameter correlating with an actual concentration of oxygen contained in the exhaust gas which is emitted from the internal combustion engine into the exhaust pipe after start of a fuel cut event in which the engine undergoes a fuel cut;

an oxygen concentration-corresponding output determining circuit that determines an oxygen concentration-corresponding output based on the given parameter, as determined by said oxygen concentration-correlating parameter determining circuit, the oxygen concentration-corresponding output being a parameter corresponding to an output of the oxygen sensor which is to represent the actual concentration of oxygen; and a correction factor determining circuit that, when required to enter a correction mode, samples an output of the oxygen sensor during the fuel cut event and determines a correction factor based on the sampled output of the oxygen sensor and the oxygen concentration-corresponding output, as determined by said oxygen concentration-corresponding output determining circuit for use in correcting an output of the oxygen sensor when the engine is undergoing no fuel cut.

2. A correction apparatus as set forth in claim 1, wherein said oxygen concentration-correlating parameter determining circuit measures an integrated amount of intake air charged into the engine after the start of the fuel cut event and defines the integral amount as the given parameter correlating with the actual concentration of oxygen.

3. A correction apparatus as set forth in claim 1, wherein said oxygen concentration-correlating parameter determining circuit measures a lapsed time since the start of the fuel cut event and defines the lapsed time as the given parameter correlating with the actual concentration of oxygen.

4. A correction apparatus as set forth in claim 1, wherein said oxygen concentration-corresponding output determining circuit has a map representing a relation between a value of the oxygen concentration-corresponding output and a value of the given parameter correlating with the actual concentration of oxygen and determines the oxygen concentration-corresponding output by look-up using the map.

5. A correction apparatus as set forth in claim 1, wherein said oxygen concentration-corresponding output determining circuit determines the oxygen concentration-corresponding output based on the given parameter, as determined by said oxygen concentration-correlating parameter determining circuit, and a speed of the engine after the start of the fuel cut event.

6. A correction apparatus as set forth in claim 1, wherein said oxygen concentration-corresponding output determining circuit determines a temperature of coolant of the engine after the start of the fuel cut event and defines the temperature of the coolant as the given parameter correlating with the actual concentration of oxygen.

7. A correction apparatus as set forth in claim 1, wherein said oxygen concentration-corresponding output determining circuit determines a pressure of exhaust gas emitted from the engine after the start of the fuel cut event and determines whether the correction mode is to be entered or not based on the pressure of exhaust gas.

8. A correction apparatus as set forth in claim 7, wherein said oxygen concentration-corresponding output determining circuit prohibits the correction mode from being entered when the pressure of exhaust gas is greater than a given threshold value.

9. A correction apparatus as set forth in claim 7, wherein said oxygen concentration-corresponding output determining circuit determines an amount of intake air charged into the engine after the start of the fuel cut event as representing the pressure of exhaust gas and prohibits the correction mode to be entered when the amount of intake air is greater than a given threshold value.

10. A correction apparatus as set forth in claim 1, wherein said correction factor determining circuit stores the correction factor as a learned value in a backup memory.

* * * * *